(12) United States Patent
Djakovic

(10) Patent No.: US 6,408,317 B1
(45) Date of Patent: Jun. 18, 2002

(54) RANDOM NUMBER CONDITIONER

(75) Inventor: Vladan Djakovic, San Jose, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

(21) Appl. No.: 09/253,016

(22) Filed: Feb. 19, 1999

(51) Int. Cl.$^7$ ................................................ G06F 1/02

(52) U.S. Cl. .................................... 708/250; 708/252

(58) Field of Search ................................ 708/250, 251, 708/252, 253, 254, 255, 256

(56) References Cited

U.S. PATENT DOCUMENTS

| 4,262,358 | A | | 4/1981 | Marino, Jr. | |
|---|---|---|---|---|---|
| 4,852,023 | A | * | 7/1989 | Lee et al. | 708/253 |
| 5,285,497 | A | | 2/1994 | Thatcher, Jr. | |
| 5,566,099 | A | * | 10/1996 | Shimada | 708/250 |
| 5,784,427 | A | | 7/1998 | Bennett | |
| 6,061,818 | A | * | 5/2000 | Touba et al. | 714/739 |
| 6,148,053 | A | * | 11/2000 | Ozluturk | 375/377 |

OTHER PUBLICATIONS

Bruce Schneier, Real Random–Sequence Generators, Applied Cryptography, Second Edition, 1996, pp. 421–428.

D. Eastlake et al., Randomness Recommendations for Security, Network Working Group Request for Comments: 1750, Dec. 1994, pp. 1–30.

* cited by examiner

Primary Examiner—Chuong Dinh Ngo
(74) Attorney, Agent, or Firm—Pillsbury Madison & Sutro

(57) ABSTRACT

A device takes as input an input bit stream and produces as output an output bit stream. A linear feedback shift register (LFSR) operates on the input bit stream and modifies the internal state of the LFSR if and only if a current bit value of the input bit stream differs from an immediately previous bit value of the input bit stream. A condenser having a compression factor N, operates on the input bit stream independently and asynchronously from the LFSR. The condenser produces a condensed value of the input bit stream. The condenser has a checksum register; a checksum accumulator register; and an adder for adding bits from the input bits stream to the checksum register. The low-order bit of the checksum register is shifted into the checksum accumulator register every N bits, and the condensed value produced by the condenser is the value in the checksum accumulator register. An exclusive-or mechanism combines the value of the LFSR and the condensed value produced by the condenser to produce the output bit stream.

28 Claims, 5 Drawing Sheets

RANDOM NUMBER CONDITIONER

CROSS-REFERENCE TO RELATED APPLICATIONS

This application is related to co-pending U.S. patent application Ser. No. 09/156,774, filed Sep. 18, 1998, titled "Cipher Mixer With Random Number Generator", which is incorporated herein by reference.

BACKGROUND OF THE INVENTION

1. Field of the Invention

This invention relates to random number generation. More particularly, this invention relates to improving the unpredictability of raw random number streams.

2. Background

In many fields of endeavor it is desirable to have a stream of random numbers. For example, related, co-pending, U.S. patent application Ser. No. 09 /156,774, filed Sep. 18, 1998, titled "Cipher Mixer With Random Number Generator", discloses improving the security of block ciphers using cipher concatenation in combination with a random number generator.

Generally, it is preferred that true random number generators be used, however, true random number generation may not always be available.

The disadvantages of purely algorithmic methods to produce sequences of supposedly random numbers are well known. It is well known that most purely algorithmic methods to random number generation produce so-called pseudo random numbers. While these sequences may be very difficult to predict, it is sometimes possible to do so. Accordingly, it is desirable to provide a true or real random sequence. True random sequence generators have the property that the generator's sequences cannot be reproduced.

Bruce Schneier, "Applied Cryptography" Second Edition, 1996, which is incorporated herein by reference, provides a useful discussion on Real Random-Sequence Generators at pgs. 421–428. See also *Network Working Group Request for Comments* 1750, December, 1994, the contents of which are incorporated herein by reference.

When sequences of numbers are pseudo-random, they may become predictable, thereby diminishing their value, especially in the areas of cryptography.

SUMMARY OF THE INVENTION

This invention solves the above and other problems by providing improved unpredictability of raw random number streams.

In order to improve the unpredictability of a raw random stream, and thereby to make the stream suitable for cryptographic purposes, it is conditioned by condensing by a compression factor, N, distilling the entropy in the process. The conditioner consists of two independent processes described below. The output of these is combined by XOR to produce final conditioned stream.

The first process calculates checksums from the input stream, by adding input bits and outputting the low-order bit of the sum (and then resetting the sum to zero) every N input bits, where N is the compression factor. For example, N may be five (5). This process is synchronous with the input stream, that is, it occurs for every input bit, The output bit is shifted into a checksum accumulator register w bits wide, for example, eight bits wide (i.e., typically, w=8). So every five (5) raw input bits will produce one output bit. The output bits are shifted into the accumulator register. In general, it takes w×N raw input bits to fill the accumulator. Thus, in preferred embodiments, it takes forty (w×N=8×5= 40) raw input bits to fill the accumulator. The process of determining the checksum produces a perfect uniform distribution of the output if the input has perfect distribution (that is, the entropy is not decreased.) Further, the checksum process greatly reduces any bias in the input stream.

The second process uses a w-bit wide shift register with feedback from some of its bits. Preferably the shift register is eight (8) bits wide (w=8) and the feedback is from bits two and four. Whenever the input stream (the same one fed to the checksum accumulator) toggles (from zero to one or vice versa), the bit causing the transition is combined with bits from the shift register (preferably XOR-ed with bits two and four), the register is shifted left (losing the high order bit) and the result of XOR is placed in the low-order bit zero.

The shift register is used (its contents are combined, preferably XOR-ed, with the contents of the checksum accumulator) every w×N (=8×5=40) raw input bits. The shift register may cycle between zero and to w×N times (40 times, for w=8, N=5), depending on number of transitions in the input stream.

Thus, in one aspect, this invention is a device which takes as input an input bit stream and which produces as output an output bit stream. The device has a linear feedback shift register (LFSR), a condenser and a combining mechanism. The LFSR is triggered by the input bit stream and modifies its internal state based upon the input bit stream. In some embodiments, the LFSR is triggered by the input bit stream and modifies its internal state whenever the input bit stream toggles. The condenser operates on the input bit stream independently and asynchronously from the LFSR and produces a condensed value of the input bit stream. The combining mechanism combines the value of the LFSR and the condensed value produced by the condenser to produce the output bit stream. Preferably, the input bit stream is produced by a random number generator.

In some embodiments, the LFSR is triggered by the input bit stream if and only if the current bit value of the input bit stream differs from the immediately previous bit value of the input bit stream.

In some embodiments, the condenser comprises a checksum register; a checksum accumulator register; and an adder for adding bits from the input bits stream to the checksum register, and a low-order bit of the checksum register is shifted into the checksum accumulator register every N bits, where N is a compression factor of the condenser, and the condensed value produced by the condenser is the value in the checksum accumulator register. Preferably, the checksum accumulator register is eight bits wide and wherein the value of N is five.

In some preferred embodiments, the combining mechanism is an exclusive-or mechanism.

In another aspect, this invention is a method for producing an output bit stream from an input bit stream. The method comprises, independently and asynchronously:

(a) changing an internal state of the LFSR based on a current bit value of the input bit stream and a previous bit value of the input bit stream;

(b) condensing the input bit stream by a compression factor to produce a condensed value.

The internal state of the LFSR and the condensed value are combined to produce the output bit stream.

In some preferred embodiments, the input bit stream is produced by a random number generator.

In some embodiments, the internal state of the LFSR is modified if and only if the current bit value of the input bit stream differs from the immediately previous bit value of the input bit stream.

In some embodiments, the condensing of the input bit stream comprises: adding bits from the input bit stream to a checksum register, and outputting a low-order bit of the checksum register to a checksum accumulator register every N bits of the input bit stream, where N is the compression factor. The condensed value produced by the condenser is the value in the checksum accumulator register. Preferably, the checksum accumulator register is eight bits wide and wherein the value of N is five.

In preferred embodiments, the internal state of the LFSR and the condensed value are combined by performing an exclusive-or of the modified bit sequence and the condensed value.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIGS. 5A–5B are graphs showing the average number of transitions in a raw input data stream.

DETAILED DESCRIPTION OF THE PRESENTLY PREFERRED EXEMPLARY EMBODIMENTS

Figure 1:
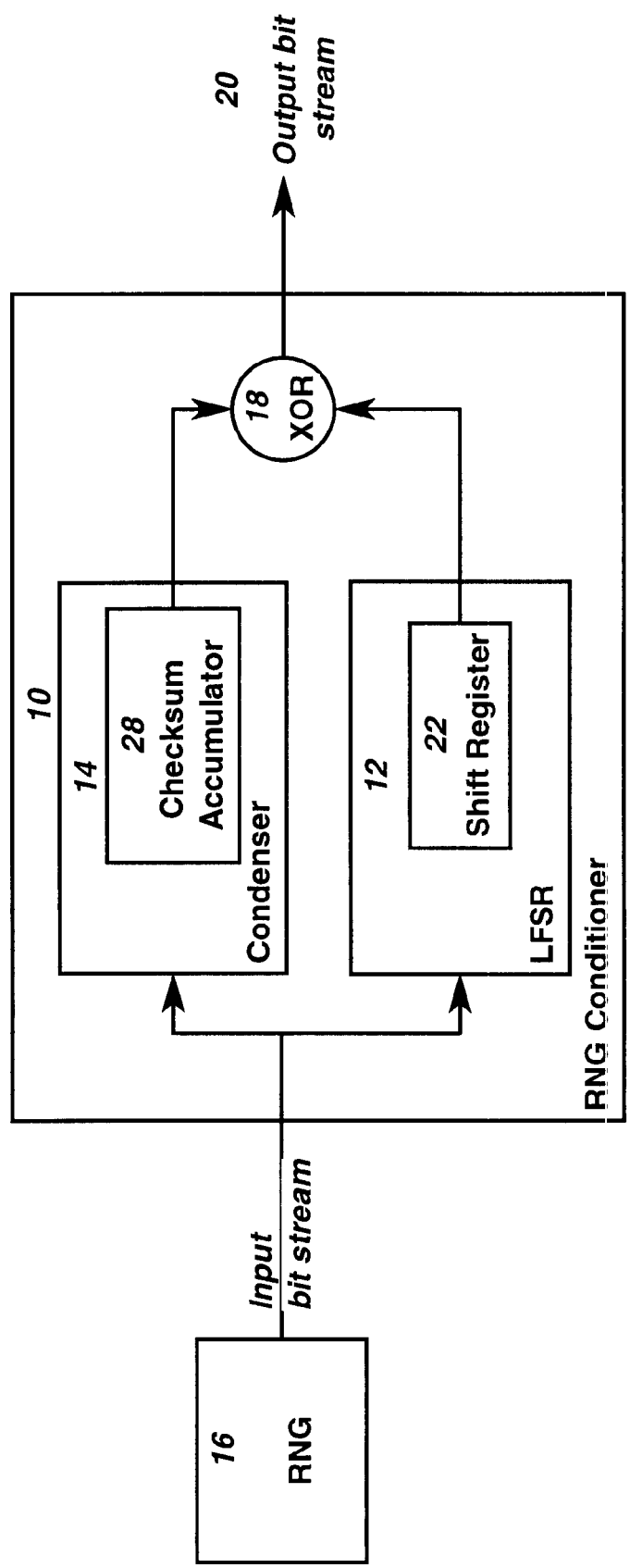
FIG. 1 depicts a random number generator (RNG) conditioner according to the present invention.

A random number generator (RNG) conditioner 10 according to the present invention, as shown in FIG. 1, includes a linear feedback shift register (LFSR) 12 and a condenser 14. The output bit stream of a RNG 16 is input to the RNG conditioner 10, where it is provided as input to both the LFSR 12 and the condenser 14. The LFSR 12 and the condenser 14 operate independently of each other on the input bit stream. The output of each of the LFSR 12 and the condenser 14 are combined, preferably by exclusive-or mechanism 18, to produce the output bit stream 20 of the RNG conditioner 10.

Figure 2:
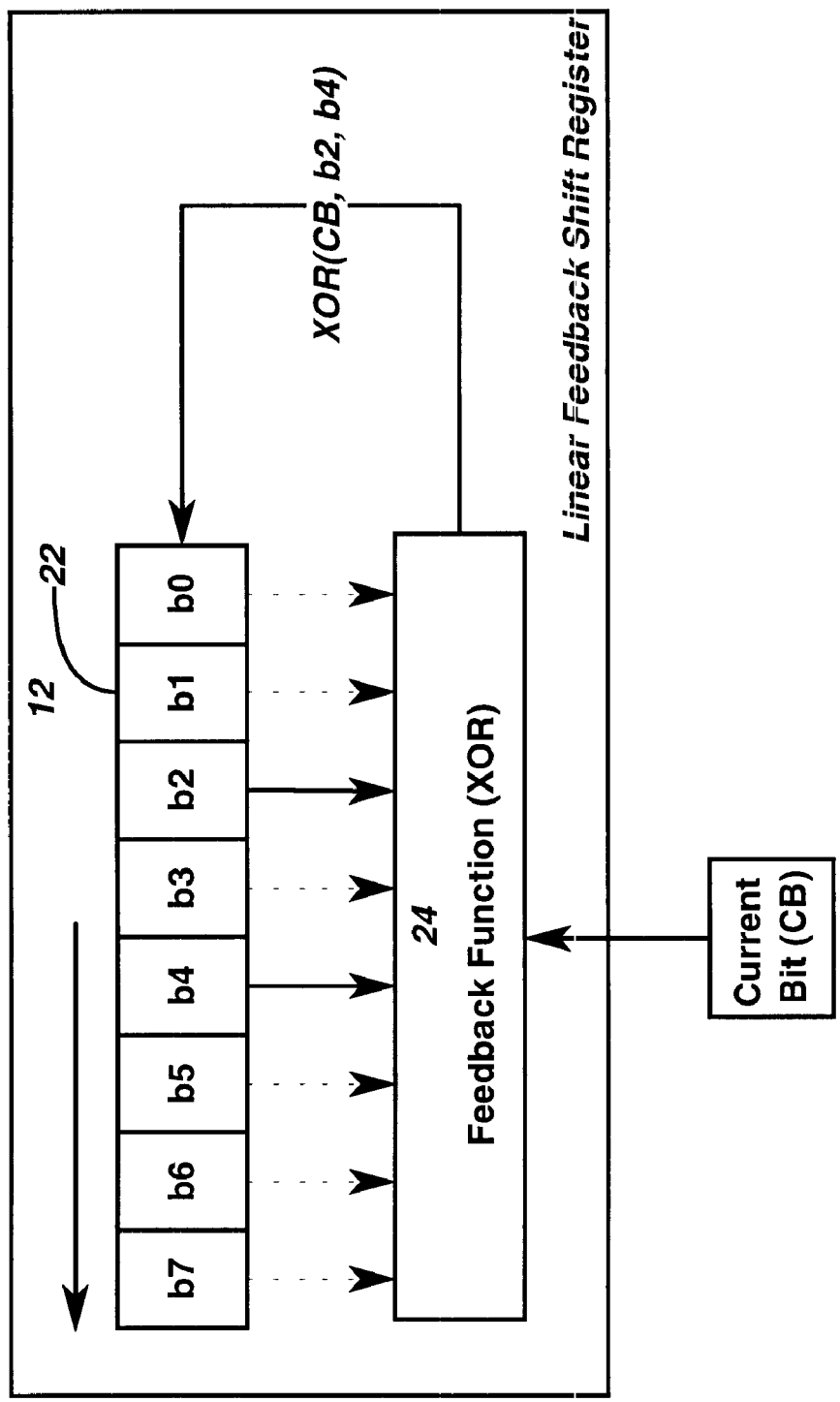
FIG. 2 depicts a linear feedback shift register (LFSR) used in the RNG conditioner of the present invention.

The linear feedback shift register (LFSR) 12 used in the RNG conditioner 10 of the present invention is shown in greater detail in FIG. 2. In preferred embodiments of this invention, the LFSR 12 is an eight-bit wide shift register 22 with feedback from its own bits. A feedback function 24 takes as input bits from the shift register 22, preferably two (b2) and four (b4), as well as the current bit of the input bit stream. Preferably the feedback function 24 is an exclusive-or function. Although the feedback function 24 preferably takes as input bits two (b2) and four (b4), the feedback function 24 can take input from some other combinations of the bits.

The shift register 22 is initialized to zero and is then provided with a bit stream of alternating one's and zero's ("101010101010 . . ."). Accordingly, it cycles through sixty two (62) different values, always in the same order. These values are 2, 5, 11, 23, 46, 92, 184, 112, 225, 195, 134, 12, 25, 50, 101, 202, 148, 41, 82, 164, 73, 147, 39, 78, 157, 59, 119, 239, 223, 191, 126, 253, 250, 244, 232, 209, 163, 71, 143, 30, 60, 121, 143, 230, 205, 154, 53, 107, 214, 173, 91, 182, 108, 216, 177, 98, 196, 136, 16, 32, 64, 129).

The LFSR 12 operates as follows: Whenever the input bit stream (from RNG 16) toggles, that is, changes from a zero to a one or vice versa, the bit causing the transition (the current bit of the input bit stream) is combined, using the feedback function 24, preferably a bitwise exclusive-or function, with bits (preferably bits b2 and b4) from the shift register 22, the shift register is shifted left (losing its high order bit b7), and the result of the combination is placed in bit zero, b0.

The condenser 14 operates synchronously with the input stream to condense the input stream by a fixed, preset compression factor. The condenser 14 operates by adding the input bits (to form a checksum) and then outputting the low-order bit of the checksum (and then resetting the sum to zero) every N bits, where N is the compression factor. For example, N may be set to five (5). The value of five was chosen in this embodiment for the compression factor N after testing an actual RNG and then adding a safety margin to factors that produced satisfactory results as measured by a randomness test suite. Note that randomness improves as the value of N increases.

Figure 3:
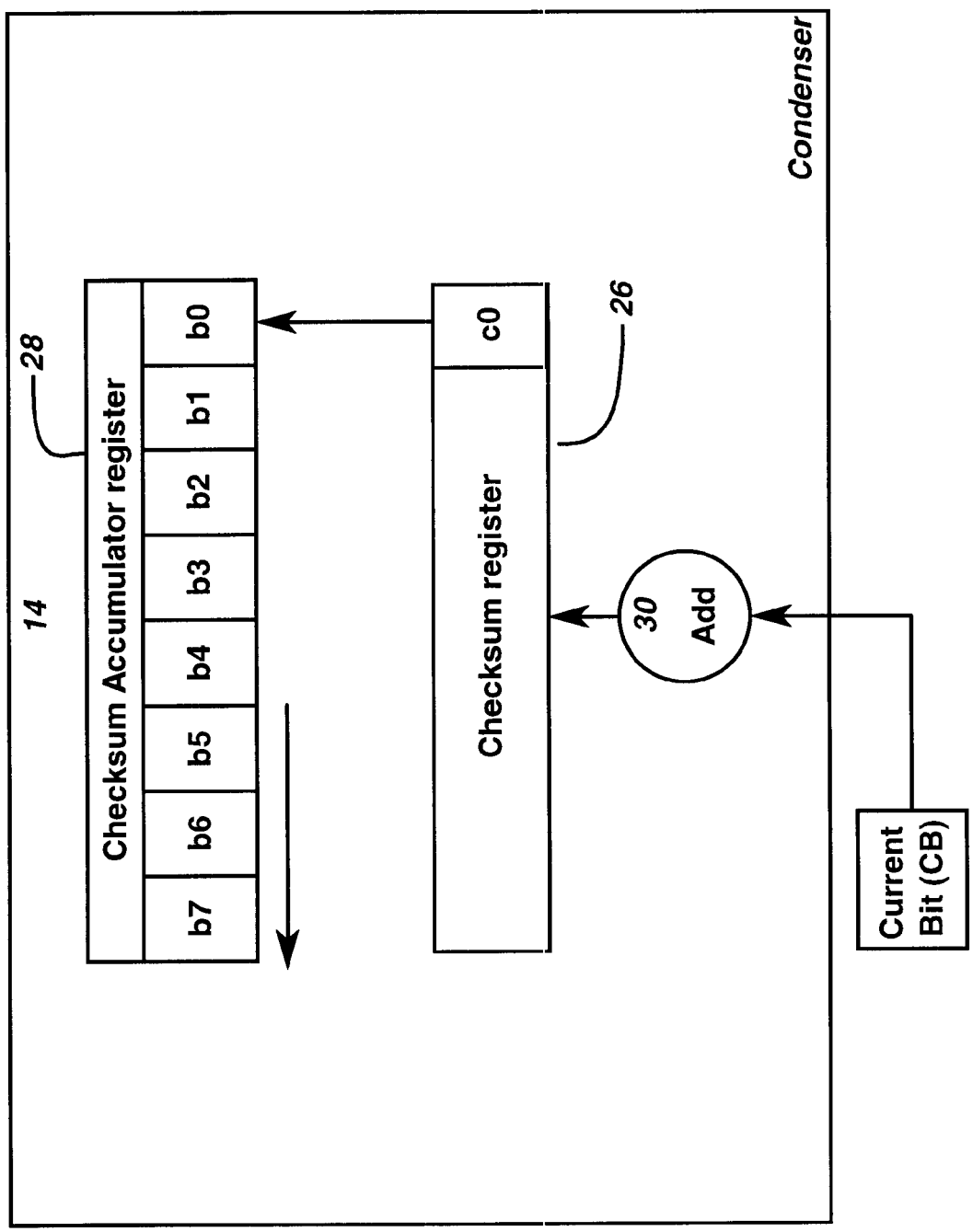
FIG. 3 depicts a condenser used in the RNG conditioner of the present invention.

With reference to FIG. 3, the condenser 14 includes a checksum register 26 and a checksum accumulator register 28, for example, eight (8) bits wide, which accumulates the checksum bits. The value in the checksum accumulator register 28 is what is combined with the value in the shift register 22 (of the LFSR 12) to produce the output of the RNG conditioner 10.

Figure 4A:
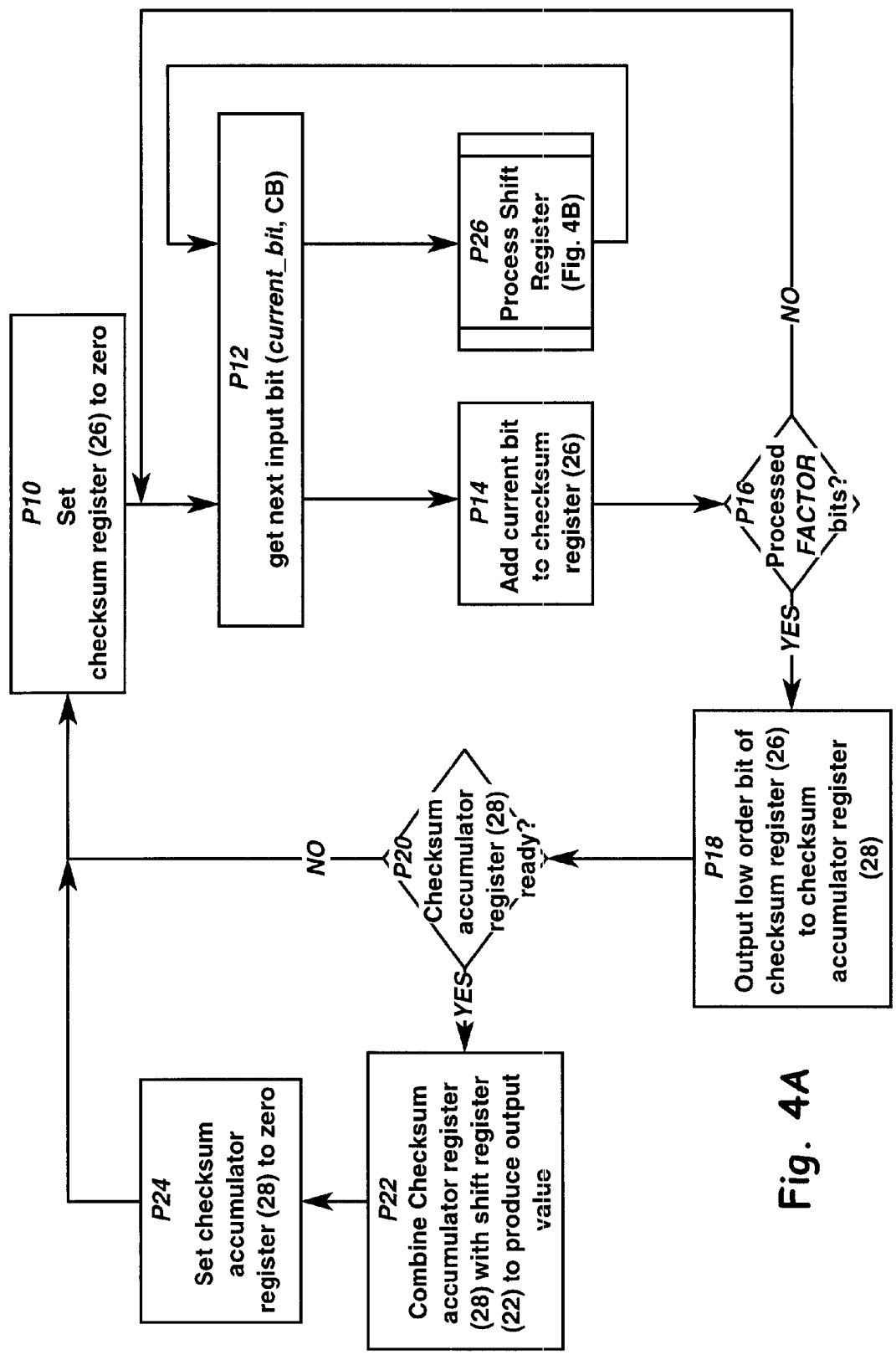
FIGS. 4A–4B depict the flow of operation of the RNG conditioner of the present invention.
Figure 4B:
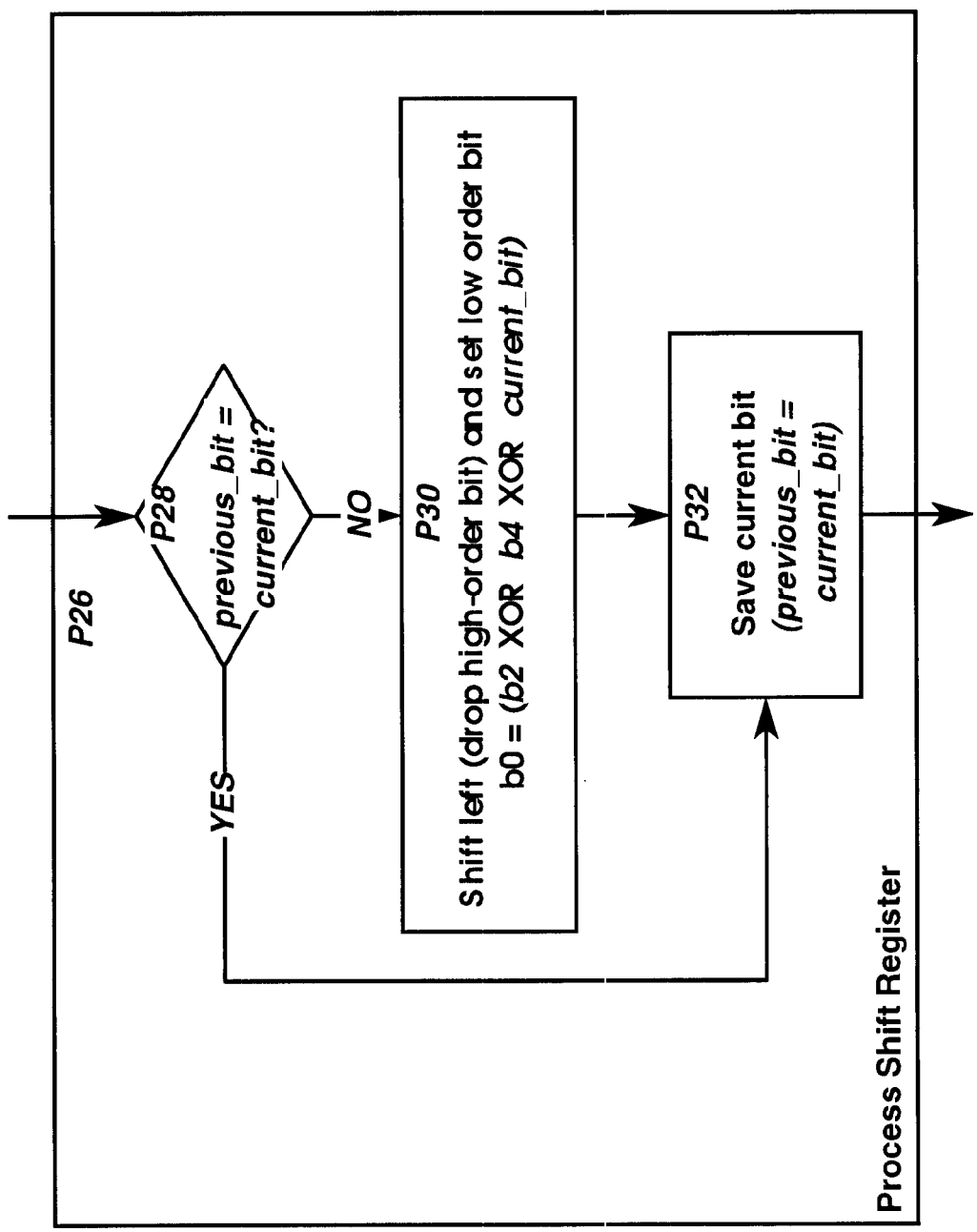

The operation of the LFSR 12 and of the condenser 14 are described with reference to FIGS. 2, 3, and the flowcharts in FIGS. 4A–4B. As noted above, the condenser 14 operates synchronously with the input stream, taking one bit at a time from the input stream while there is more data in the input stream, whereas the LFSR 12 is not synchronous with the input bit stream since it only operates when the input bit stream toggles its value.

The condenser 14 uses two registers, a checksum register 26 and the checksum accumulator register 28, described above. For convenience, the value in the checksum register 26 is denoted checksum, and the value in the checksum accumulator register 28 is denoted checksum_accumulator.

First, the value checksum in the checksum register 26 is set to zero (0) (at P10). Then the next input bit, denoted current_bit (or CB), is obtained from the input stream (at P12). The current bit is added to the checksum register 26 (at P14). This process is repeated for N input bits, where N is the condensation factor. Thus, (at P16) it is determined whether N bits have been processed, i.e., have been added to the checksum register 26. If not, the process (P12, P14, P16) is repeated. On the other hand, if it is determined (at P16) that N input bits have been processed, the low-order bit of the checksum register 26 (denoted "c0" in FIG. 3) is shifted (at P18,) into the checksum accumulator register 28, and the value in the checksum register 26 is reset to zero (at P10).

Thus, for every N input bits, the checksum register 26 produces one (1) output bit to the checksum accumulator register 28. As noted, preferably the checksum accumulator register 28 is eight (8) bits wide, so that it takes forty (40) input bits from the RNG 16 in order to fill the checksum accumulator register 28.

After each N-th input bit has been added to the checksum accumulator register 28, a determination is made (at P20) as to whether or not the checksum accumulator register 28 is ready to be combined with the shift register 22. That is, a check is made as to whether w bits have been shifted into the checksum accumulator register 28, where w is the width of the checksum accumulator register 28, preferably eight (8). If the checksum accumulator register 28 is not yet ready, processing continues (at P10), setting the checksum register 26 to zero. On the other hand, if it is determined (at P20) that the checksum accumulator register 28 is ready, i.e., w bits have been shifted into the checksum accumulator register 28 from the checksum register 26, then the checksum accumulator register 28 is combined (preferably by exclusive-or mechanism 18,) with the shift register 22 (at P22) to produce the output bit stream 20 of the RNG conditioner 10. Then the value in the checksum accumulator register 28 is set to zero (at P24) and processing continues (at P10).

While the condenser 14 is operating as described above, the LFSR 12 also operates on the input bit stream. After the next input bit, denoted current_bit (or CB), is obtained from the input stream (at P12), the LFSR 12 begins processing (at P26, FIG. 4B). First, the current bit is compared to the previous bit (at P28). On the other hand, if it is determined (at P28) that the current bit is not equal to the previous bit, i.e., the input bit stream has toggled value (from zero to one or vice versa), then the shift register 22 is shifted left one to drop the high-order bit (b7) and the low order bit (b0) is set to according to the feedback function 24 and the previous value is set to the current value. That is, preferably, the low-order bit (b0) is set to the exclusive-or of bits two and four of the shift register 22 and the current bit. That is, $$b0 = CB \oplus b2 \oplus b4,$$

where the operator "$\oplus$" denotes the exclusive-or function.

The current bit is then saved (at the previous bit) (at P32) and processing continues with the next input bit.

The following C code describes an implementation of this invention:

```
int i, j, checksum;
unsigned char shiftreg, *rawbits, *outputbits,
    eightbitcounter, current_bit, csum_accumulator,
    eightbitbucket, previous_bit,
    *p1, *p2;
csum_accumulator = 0; i = 0;
p2 = outputbits; previous_bit = 0; shiftreg = 0;
eightbitcounter = 0;
for (p1 = rawbits; p1 < rawbits + RAWBITS_SIZE:)  {
    if(i > 7) { /* produce final output */
        i = 0
        *p2++ = csum_accumulator ^ shiftreg;
        csum_accumulator = 0
    }
    checksum = 0;
    for (j = 0; j < FACTOR; j++) {
        if (eightbitcounter == 0) {
            eightbitbucket = *p1++; /* fill 8 */
            eightbitcounter = 8;
        }
        current_bit = eightbitbucket & 1;
        if (current_bit ! = previous_bit) { /* cycle shiftreg */
            unsigned char t, t1
            t = (shiftreg >>4) & 1;
            t1 = (shiftreg >>2) &1;
            shiftreg = shiftreg <<1;
            t = t ^ t1 ^ current_bit;
            shiftreg = shiftreg | t;
            previous_bit = current_bit;
        }
        checksum = checksum + current_bit;
        eightbitbucket = eightbitbucket >> 1;
        eightbitcounter--;
    }
    csum_accumulator = csum_accumulator <<1;
    csum_accumulator = csum_accumulator | (checksum & 1);
    i++;
}
```

The RNG 16 produces as its output a sequence of random numbers. Preferably the RNG 16 is a true random number generator. Embodiments of this invention can be implemented with any commercially available RNG, e.g., the RBG1210 random number generator manufactured by Tundra Semiconductor Corporation or the SG100 Security Generator manufactured by Protego Corporation.

In a preferred embodiment, raw random bits are generated by bringing a reverse polarized diode junction (Zener) on a chip into avalanche mode by applying a near-breakdown voltage.

The condensation factor N for the condenser 14 (5) was chosen after testing the actual RNG and adding the safety margin to factors that produced satisfactory results, as measured by various randomness test suites.

As noted above, the shift register is used every N×w raw input bits, and it may cycle between zero and N×w times (40 times for N=5, w=8), depending on number of transitions in the input stream. Tests show that for N=5, w=8, around nineteen (19) transitions has the highest probability. FIGS. 5A–5B are graphs showing the average number of transitions in a raw input data stream. FIG. 5A shows a first sample (Sample 1) of nine Mbytes of raw data with a factor of five (5). FIG. 5B shows a second sample (Sample 2) of nine Mbytes of raw data with a factor of five (5). From both of these samples it can be seen that the input stream has the highest probability of having nineteen transitions for N=5, w=8.

Importantly, the condensing and the shift register processing are independent and asynchronous (there is no evidence that links parity with the number of transitions in avalanche noise bit stream.) Use of the shift register in addition to the checksum accumulator reduces required compression factor as determined by experiments.

Simulations of the complete conditioner with N=3, with input taking all possible values from 0 to $2^{24-1}$ produced 65,536 hits of each of 256 possible output values, for each of 62 possible LFSR values.

Both processes can be efficiently implemented in hardware, with low number of gates and replicated many times if necessary.

This method produces good unpredictability, as measured with standardized tests (*Diehard and Maurer's Universal Statistical Test*). The required factor depends on quality of the input stream, also measured by the same tests, which gives confidence that this conditioner actually does distill randomness and is not merely a smart pseudo-RNG.

Thus, are provided random number conditioners and methods for improving unpredictability of raw random number streams. One skilled in the art will appreciate that the present invention can be practiced by other than the described embodiments, which are presented for purposes of illustration and not limitation, and the present invention is limited only by the claims that follow.

What is claimed is:

1. A device taking as input an input bit stream and producing as output an output bit stream, the device comprising:

a linear feedback shift register (LFSR) which modifies its internal state based on the input bit stream;

a condenser which operates on the input bit stream independently and asynchronously from the LFSR and which produces a condensed value of the input bit stream; and a combining mechanism which combines the internal state of the LFSR and the condensed value produced by the condenser to produce the output bit stream.

2. A device as in claim 1 wherein the input bit stream is produced by a random number generator.

3. A device as in claim 1 wherein the LFSR modifies its internal state if and only if the current bit value of the input bit stream differs from the immediately previous bit value of the input bit stream.

4. A device as in claim 1 wherein the condenser comprises:

a checksum register, a checksum accumulator register; and an adder for adding bits from the input bits stream to the checksum register, wherein a low-order bit of the checksum register is shifted into the checksum accumulator register every N bits, where N is a compression factor of the condenser, and wherein the condensed value produced by the condenser is the value in the checksum accumulator register.

5. A device as in claim 4 wherein the checksum accumulator register is eight bits wide and wherein the value of N is five.

6. A device as in claim 1 wherein the combining mechanism is an exclusive-or mechanism.

7. A device taking as input an input bit stream and producing as output an output bit stream, the device comprising:

(A) a linear feedback shift register (LFSR) which modifies its internal state if and only if the input bit stream toggles;

(B) a condenser having a compression factor N, and which operates on the input bit stream independently and asynchronously from the LFSR and which produces a condensed value of the input bit stream, the condenser comprising:

(b1) a checksum register;

(b2) a checksum accumulator register; and (b3) an adder for adding bits from the input bits stream to the checksum register, wherein a low-order bit of the checksum register is shifted into the checksum accumulator register every N bits, and wherein the condensed value produced by the condenser is the value in the checksum accumulator register; and (C) an exclusive-or mechanism which combines the internal state of the LFSR and the condensed value produced by the condenser to produce the output bit stream.

8. A device as in claim 7 wherein the checksum accumulator register is eight bits wide and wherein the value of the compression factor N is five.

9. A method for producing an output bit stream from an input bit stream, the method comprising:

(a) independently and asynchronously modifying a bit sequence based on the input bit stream;

(b) independently and asynchronously condensing the input bit stream by a compression factor to produce a condensed value; and (c) combining the modified bit sequence and the condensed value to produce the output bit stream.

10. A method as in claim 9 wherein the input bit stream is produced by a random number generator.

11. A method as in claim 9 wherein the bit sequence is modified if and only if the input bit stream toggles.

12. A method as in claim 9 wherein the condensing of the input bit stream comprises:

adding bits from the input bit stream to a checksum register, outputting a low-order bit of the checksum register to a checksum accumulator register every N bits of the input bit stream, where N is the compression factor, wherein the condensed value produced by the condenser is the value in the checksum accumulator register.

13. A method as in claim 12 wherein the checksum accumulator register is eight bits wide and wherein the value of N is five.

14. A method as in claim 9 wherein the combining of the modified bit sequence and the condensed value comprises performing an exclusive-or of the modified bit sequence and the condensed value.

15. A method for producing an output bit stream from an input bit stream, the method comprising:

(a) independently and asynchronously modifying a bit sequence based on the input bit stream, wherein the bit sequence is modified if and only if the current bit value of the input bit stream differs from the immediately previous bit value of the input bit stream;

(b) independently and asynchronously condensing the input bit stream by a compression factor to produce a condensed value, the condensing comprising:

(b1) adding bits from the input bit stream to a checksum register, and (b2) outputting a low-order bit of the checksum register to a checksum accumulator register every N bits of the input bit stream, where N is the compression factor, wherein the condensed value produced by the condenser is the value in the checksum accumulator register; and (c) combining the modified bit sequence and the condensed value to produce the output bit stream.

16. A method as in claim 15 wherein the checksum accumulator register is eight bits wide and wherein the value of N is five.

17. A method as in claim 15 wherein the combining of the modified bit sequence and the condensed value comprises performing an exclusive-or of the modified bit sequence and the condensed value.

18. A method as in claim 15 wherein the checksum accumulator register is eight bits wide and wherein the value of the compression factor N is five.

19. A computer program product including computer program code to cause a processor to perform a method for producing an output bit stream from an input bit stream, the method comprising:

(a) independently and asynchronously modifying a bit sequence based on the input bit stream;

(b) independently and asynchronously condensing the input bit stream by a compression factor to produce a condensed value; and (c) combining the modified bit sequence and the condensed value to produce the output bit stream.

20. A computer program product as in claim 19 wherein the input bit stream is produced by a random number generator.

21. A computer program product as in claim 19 wherein the bit sequence is modified if and only if the input bit stream toggles.

22. A computer program product as in claim 19 wherein the condensing of the input bit stream comprises:

adding bits from the input bit stream to a checksum register, outputting a low-order bit of the checksum register to a checksum accumulator register every N bits of the input bit stream, where N is the compression factor, wherein the condensed value produced by the condenser is the value in the checksum accumulator register.

23. A computer program product as in claim 22 wherein the checksum accumulator register is eight bits wide and wherein the value of N is five.

24. A computer program product as in claim 19 wherein the combining of the modified bit sequence and the condensed value comprises performing an exclusive-or of the modified bit sequence and the condensed value.

25. A computer program product including computer program code to cause a processor to perform a method for producing an output bit stream from an input bit stream, the method comprising:

(a) independently and asynchronously modifying a bit sequence based on the input bit stream, wherein the bit sequence is modified if and only if the current bit value of the input bit stream differs from the immediately previous bit value of the input bit stream;

(b) independently and asynchronously condensing the input bit stream by a compression factor to produce a condensed value, the condensing comprising:

(b1) adding bits from the input bit stream to a checksum register, and (b2) outputting a low-order bit of the checksum register to a checksum accumulator register every N bits of the input bit stream, where N is the compression factor, wherein the condensed value produced by the condenser is the value in the checksum accumulator register; and (c) combining the modified bit sequence and the condensed value to produce the output bit stream.

26. A computer program product as in claim 25 wherein the checksum accumulator register is eight bits wide and wherein the value of N is five.

27. A computer program product as in claim 25 wherein the combining of the modified bit sequence and the condensed value comprises performing an exclusive-or of the modified bit sequence and the condensed value.

28. A computer program product as in claim 25 wherein the checksum accumulator register is eight bits wide and wherein the value of the compression factor N is five.

* * * * *